United States Patent [19]

Nieminen et al.

[11] Patent Number: 5,458,960

[45] Date of Patent: Oct. 17, 1995

[54] FLEXIBLE BASE WEB FOR A CONSTRUCTION COVERING

[75] Inventors: Jorma Nieminen, Kankaanpää; Jean Le Bell, Kaarina; Ulf Westerlund, Pargas; Erkki Närhi, Lemu, all of Finland

[73] Assignee: Roctex Oy AB, Finland

[21] Appl. No.: 15,129

[22] Filed: Feb. 9, 1993

[51] Int. Cl.$^6$ ............... B32B 5/26; B32B 5/28; B32B 31/08; D04H 1/46; D04H 1/48

[52] U.S. Cl. ............... 428/284; 28/107; 28/112; 428/285; 428/286; 428/287; 428/290; 428/300

[58] Field of Search ............... 428/300, 284, 428/285, 286, 287, 290; 28/107, 112

[56] References Cited

U.S. PATENT DOCUMENTS

| | | | |
|---|---|---|---|
| 3,956,783 | 5/1976 | Stoller | 428/300 |
| 3,994,759 | 11/1976 | Stoller | 428/300 |
| 4,042,655 | 8/1977 | Platt et al. | 428/301 |
| 4,237,180 | 12/1980 | Jaskowski | 428/300 |
| 4,342,813 | 8/1982 | Erickson | 428/288 |
| 4,363,682 | 12/1982 | Thiebault | 428/296 |
| 4,381,330 | 4/1983 | Gotomyo | 428/300 |
| 4,416,936 | 11/1983 | Erickson | 428/300 |
| 4,522,876 | 6/1985 | Hiers | 428/300 |
| 4,568,581 | 2/1986 | Peoples | 428/300 |
| 4,582,750 | 4/1986 | Lou et al. | 428/300 |
| 5,014,396 | 5/1991 | Nieminen | 19/205 |

Primary Examiner—James C. Cannon
Attorney, Agent, or Firm—Pollock, Vande Sande & Priddy

[57] ABSTRACT

Flexible base web of a construction covering comprises a main layer extending at least over the greatest part of the thickness of the web and is constituted of a non-woven mineral fiber mat containing predominantly discontinuous mineral fibers. Said mat contains further blend fibers. The mat is manufactured using a dry method by means of an air stream whereby said blend fibers have become blended inside the mat during the dry method forming of the mat. The portion of said blend fibers is greater in the proximity of one of the surfaces of the mat than in the middle due to subsequent needling of the mat.

10 Claims, 1 Drawing Sheet

FLEXIBLE BASE WEB FOR A CONSTRUCTION COVERING

The invention relates to a flexible base web for a construction covering, comprising a main layer extending at least over the greatest part of the thickness of the web and being constituted of a non-woven mineral fiber mat containing predominantly discontinuous mineral fibers, said mat containing further blend fibers, the mat being manufactured using a dry method by means of air stream.

BACKGROUND OF THE INVENTION

It is known to use as a base of different building materials, such as floor or wall coverings, roofing felts etc., a felt-like material for effecting sound/or thermal insulation. Especially good step sound dampening properties and also thermal insulation capability as well as capability of protecting constructions from possible fire are required particularly in the case of floor and wall coverings. Same properties, especially concerning the fire protection, are required in the case of roofing felts.

The webs in question and building materials having such webs as their bases, as well as other manufacturing methods of the same are widely discussed in patent literature, for example in European Patent Application 176,847 (Hoechst AG), German Offenlegungsschrift 1,919,709 (Saint Gobain), German Offenlegungsschrift 3,226,041 (Didier-Werken AG), U.S. Pat. No. 4,657,801 (Hoechst AG), British Patent 1,532,621 (Nairn Floors Ltd.), German Offenlegungsschrift 3,017,018 (GAF Corporation) and U.S. Pat. No. 4,175,514 (GAF Corporation).

Said patents and patent applications disclose webs and products manufactured therefrom having no optimal strength, thermal insulation and fire protection properties nor processability in manufacture.

U.S. Pat. No. 4,522,876 (Lydall, Inc.) shows a mat comprising at least one organic fiber layer and at least one glass fiber layer. The layers are bound together by needling. The mat is used as a heat insulator to be placed between the floor board of an automobile and the carpet of an automobile. The organic fiber layer is relatively thin, and functions mainly as a strength component and containment of the glass fibers of the glass fiber layer.

OBJECTS AND SUMMARY OF THE INVENTION

The object of the present invention is to create a product with superior strength and insulation properties and with possibilities to use the base web either as such or to join it on other layers. For realizing the purpose the blend fibers contained in the mat have become blended inside the mat during the dry method forming of the mat, the portion of said blend fibers being greater in the proximity of one of the surfaces of the mat than in the middle due to subsequent needling of the mat.

The main layer forms the greatest layer in the base web in thickness and in grammage (weight per unit area) and it can be the sole layer in the web. According to another embodiment of the invention, the web contains a separate surface layer which is thinner than the main layer and contains thermally bondable fibers which upon needling of the surface layer on top of the main layer form said blend fibers, the parts of said thermally bondable fibers originating from the separate surface layer being exposed on the opposite surface of the mat due to the needling and form a pile-like structure.

This kind of web possesses good strength and insulation properties and both surfaces of the web can be used for joining an additional layer to the web.

Other features of the invention will be apparent from the following disclosure and claims.

DETAILED DESCRIPTION OF THE INVENTION

Figure 1:
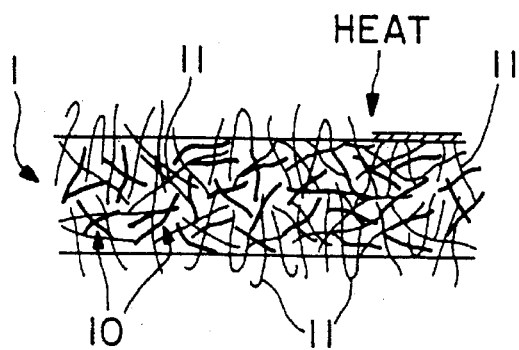
FIG. 1 shows schematically the web of the invention in cross-section.
Figure 2:
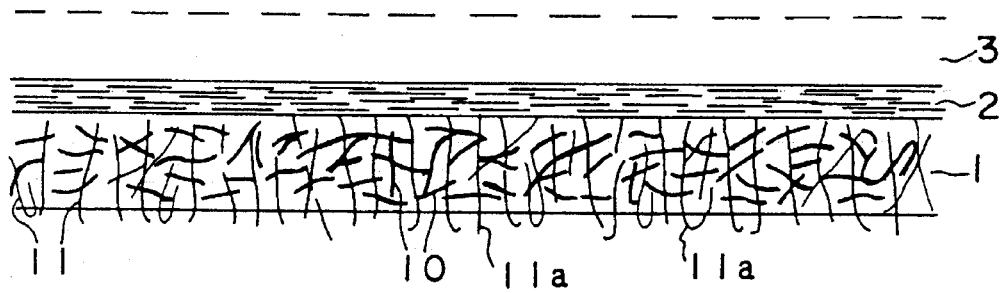
FIG. 2 shows the web according to another embodiment of the invention.

The main layer is denoted by reference numeral 1 in FIGS. 1 and 2. The main layer comprises mainly discontinuous mineral fibers 10, such as mineral wool (rock wool), glass wool or slag wool fibers or ceramic fibers or carbon fibers, generally relatively short discontinuous fibers. The term "discontinuous fiber" means in this context the opposite of a filament fiber. By virtue of a good adherence effected by the invention, the weight of the main layer 1 may be quite large, such as 2000 $g/m^2$. Grammage of the main layer may, however, vary within a wide range, e.g. between 80–2000 $g/m^2$. An optimal fire protection and sound dampening without need for making the main layer too thick is achieved with values 200–600 $g/m^2$. The density of the main layer is preferably over 200 $kg/m^3$ for achieving a good insulation capability. The length of the mineral fibers in the main layer is mostly within a range of 1–20 mm, preferably 4–10 mm. In the case of glass wool fibers and carbon fibers, the above-mentioned values may be greater. Considering the costs and thermal resistance, mineral wool (rock wool) and slag wool fibers are preferred. These last-mentioned fibers are generally manufactured by a melt-spinning process from a molten suitable rock or slag, and their manufacture, being well-known in the prior art, is not described here in more detail.

The non-woven mineral fiber mat forming the main layer 1 is manufactured using a dry method without chemical binders. The term dry method implies in this context that the pre-treated discontinuous fibers have been blown by means of an air stream on top of a perforate wire to form a mat while the air stream passes through said wire. Reference is made to a previous U.S. Pat. No. 5,014,396, describing said method in more detail. Pre-treated fibers, that is, mineral fibers, which are disentangled from each other so thoroughly as possible prior to forming the mat and from which impurities have been removed after the melt-spinning of the mineral fibers, have been used as a raw material for the mat.

A separate coating layer may be applied on top of the base web for making a sandwich-type construction covering and it may be any applicable hardenable paste which is adhered to the base web by the effect of heat and/or chemical bonding. Alternatively the top of the base web can be provided with the coating layer in a film form by laminating by heating the surface of the film to the softening temperature before it is joined to the surface of the base web. The coating layer is may be of any synthetic polymeric material forming a closed impervious top surface of the construction covering. Suitable materials are e.g. PVC (polyvinyl chloride) or CPE (chlorinated polyethylene). The coating operations are discussed hereinbelow in more detail.

The fibers 10 of the main layer 1 are mixed with other fibers 11 as well, called hereinafter "blend fibers" during the forming of the fibrous mat, for example with chopped glass fibers in an amount not higher than 40 w-% or with synthetic fibers, such as with polyester, in an amount not higher than 20 w-%. The term "chopped glass fiber" means that the chopped glass fibers are prepared by cutting continuous glass filament into shorter fibers, whereby these fibers have homogenic properties as regards thickness and strength, making them useful as a reinforcing fiber in a web the rest of which is mainly constituted of fibers of not so uniform properties, such as rock wool or slag wool fibers. The upper limit of the amount of chopped glass fibers is determined by their relatively high price. The term "synthetic fiber" means fiber of a synthetic polymeric material.

The blend fibers 11 may be mixed inside the main layer in course of the mat laying process by mixing them to the other fibers before the mat is laid on a pervious carrier and they improve the strength of the fibrous mat without decreasing its fire protection or sound dampening properties. The main layer 1 is made to a consolidated layer mechanically by needling, whereby the fibers mixed in the above-described manner help in binding the mat. Especially where the medium length of the blend fibers 11 is greater than that of the mineral fibers 10, these fibers serve effectively as the contributing factor to the strength. As shown by FIG. 1, the portion of the blend fibers 11 becomes greater in the proximity of one of the surfaces of the mat than in the middle subsequent to needling, because needling is effected so that the blend fibers 11 are entrained by the needles and shifted towards the surface opposite to that from where the needles punch the mat. If the needling is effected in this way from both sides, the blend fibers 11 shift towards both surfaces and the mat becomes a more symmetric structure in depth. The needling density is preferably in the range of 2 to 20 punches per square centimeter, calculated as the total amount of punches made on the mat from one side or from both sides, an amount considerably smaller than for example in U.S. Pat. No. 4,522,876 discussed hereinabove.

The medium length of the synthetic fibers serving as the blend fibers 11 can be e.g. 20–25 mm and the medium length of the chopped glass fibers serving as the blend fibers 11 can be ca 50 mm. In this case, the length of the mineral fibers can be within the range of 3–10 mm. The curvature or "crimp" of the synthetic fibers is also an asset in bonding the mineral fibers 10 together.

The synthetic fibers serving as the blend fibers 11 are preferably thermally bondable fibers, which include all fiber types that become bonded by virtue of a change in their structure effected by heat, such as phenol-based fibers or thermoplastic fibers. These properties of the synthetic fibers can be utilized by subjecting the mat to a light thermal bonding in order to improve the strength, or even by changing the shape of the mat permanently in a heated mold, for example when manufacturing shaped insulating or lining bodies to be placed inside a vehicle, such as a car.

As shown by FIG. 1, parts 11a of the blend fibers 11, which in this case are thermally bondable fibers, have become exposed on the surface of the mat in the needling, when the needling stroke length is properly adjusted. These parts may be the fiber ends or fiber loops and they form a pile-like structure on the surface of the mat. The term exposed means in this context that the part 11a of the blend fiber 11 protrudes from the surface of the mat without lying on flat on it, as may be the case of some blend fibers which have not changed their positions in the needling. When the surface is subjected to a thermal treatment, the pile-like structure can be formed into a thin impervious membrane which is of use, if it is important to protect the interior of the mat during the subsequent processing or manufacturing stages, as will be discussed hereinafter.

If thermoplastic fibers are used as the blend fibers 11, they may be constituted of two materials having different melting points. If the mat is subjected to thermal treatment in any way described above, the lower melting fiber material participates in the thermal bonding, whereas the higher melting fiber material may retain its fibrous structure and contribute to the structure of the mat mechanically without changing its properties.

By choosing the materials of the blemd fibers 11 according to the actual need, the adherence properties can be controlled within a wide range without any side effect on the other properties of the main layer 1. The blend fibers of the surface layer may comprise e.g. polyethylene melting at ca 100° C. and polyester melting at ca 200° C. Also other material combination may be used, such as polyethylene-polypropene or polypropene-polyester. The above-mentioned substances shall be understood to mean also their copolymers, that is, polymers containing their monomeric units, or also their derivatives, that is, polymers having the carbon skeleton of the basic polymer and the bonds between the monomeric units, but different side groups.

The thermoplastic blend fibers 11 can in the case of two different materials be composed of two different fiber grades or they may be bicomponent fibers, where the material on the surface of the fiber melts at a lower temperature and the fiber core melts at a higher temperature. The bicomponent fibers may also consist in cross-section of two halves of differently melting materials.

In FIG. 2 is shown a base web according to another embodiment of the invention, a so-called combination web. The base web is a non-woven flexible mat manufactured of relatively short fibers described hereinabove. The main layer 1 of the combination web consists mostly of discontinuous mineral fibers and on top of it there is a surface layer 2 containing fibers bonded together thermally. The surface layer 2 is quite thin, 0.5–1 mm, and is constituted either wholly or partly of such discontinuous fibers orientated parallelly with the main plane of the base web which in a thermal treatment can be bound together. The fibers can be of the same type as discussed hereinabove. The thermal treatment takes place preferably at a temperature 100°–200° C. The surface layer can contain at least two fibrous materials melting at different temperatures. By melting the fibers of one material entirely in a thermal treatment the surface layer retains its fibrous structure due to the other fibers having a higher melting point.

A coating layer 3 may be fixed thermally to the base web either by bringing it in a melted state onto the web, or by melting the layer partly on the side facing the web before bringing it into contact with the base web. After coming in contact with the web the melted polymeric material on solidifying binds the coating layer 3 to the web. One advantage of the invention when the combination web is coated thermally with a coating layer 3 brought to a suitable state, e.g. with a melted paste or with a partly melted film, is that the melted material of the coating layer and the supporting main layer 1 can in this case not directly interact with each other. When a coating layer in a melted flowing state is used, the material would without the presence of a separating material penetrate quite deeply into the main layer 1 causing a not-uniform change in the properties of the layer, and it can thus not be controlled easily for finding an advantageous optimum state. In this case, undesirable alterations in quality ought to be accepted, or much efforts and expenses ought to be used solely for reaching a uniform quality. When a paste is used its consumption would be large due to the open fibrous structure of the mineral fiber layer of the web in comparison to the use the paste is meant for. The separating effect of the surface layer 2 is more important in the case of flowing coating paste, but it has also a bonding effect to be discussed hereinafter.

The surface layer 2 acts also as a bonding layer between the coating 3 and the main layer 1. Because the surface layer 2 has fibers bondable thermally together, they are also bonded due to the not coating paste firmly to the coating layer. If the surface layer has two different fiber materials having different melting points, the fibers of the higher melting material can first be bonded together so, that the lower melting material is caused to melt during a thermal treatment of the base web before the coating, as presented hereinabove. The coating with the coating layer on top of the combination can thereafter be carried out at the melting temperature of the higher melting material.

By choosing the components of the surface layer 2 according to the actual need, the adherence properties can be controlled within a wide range without any side effect on the other properties of the main layer 1. The bonding fibers of the surface layer may comprise e.g. polyethylene melting at ca 100° C. and polyester melting at ca 200° C. Also other material combination may be used, such as polyethylene-polypropene or polypropene-polyester. The above-mentioned substances shall be understood to mean also their copolymers, that is, polymers containing their monomeric units, or also their derivatives, that is, polymers having the carbon skeleton of the basic polymer and the bonds between the monomeric units, but different side groups. It is also understood that the fibers of the surface layer can be of any thermally bondable fibers as presented hereinabove with reference to the synthetic blend fibers 11, including thermoplastic bicomponent fibers.

The combination web of the invention affords versatile possibilities for use as parts of different construction materials. For example a coating paste to be spread at a later stage can not penetrate into the actual main layer, which can be any web structure containing predominantly mineral fibers. The properties of the main layer can thus be optimized in course of the manufacture of the combination web quite exactly to be on a desired level, without needing to worry about the changes of these properties due to another material spread or attached onto the web at a later stage.

The surface of the surface layer 2 is smooth towards the coating layer 3 after the heat treatment following the needling, to such an extent that it has no protruding fibers. Its porosity can be, however, adjusted in a controllable manner by choosing the fiber grades and the thermal treatment according to the need in order to afford a good adherence surface for the paste. The adherence is also promoted by chemical bonding, which can be effected by treating the surface according to the need using methods known as such.

Subsequent to the needling from the side of the surface layer 2, the main layer 1 contains some fibers of the surface layer penetrated into the main layer 1 and forming blend fibers 11 of the main layer 1. These fibers extend mainly transversely to the main plane of the web. The reference numeral 11a denotes in FIG. 2 schematically those fiber parts that as a result of a properly adjusted stroke length in the needling are exposed on the opposite side of the main layer 1 which otherwise would be substantially free of the blend fibers 11, the term "exposed" meaning in this context the same as above. It is possible to use these parts 11a forming a pile-like structure on the opposite side of the main layer 1 as an aid in attaching the coating layer 3 onto the main layer 1. On this side the parts 11a, fiber ends or loops, form a surface which can be formed to a thin impervious membrane in a thermal pretreatment protecting the main layer 1 from the side where the surface layer 2 is absent. The plastics material of the coating layer 3 can easily be secured thermally either by laminating in the above-mentioned manner or as a melted paste on this membrane. It is thus possible to form also on the opposite side of the main layer a sort of thin surface layer having a separating and binding effect. If the coating layer 3 is attached on this side, the surface layer 2 constitutes the lower free surface of the web and acts merely as a reinforcing layer in this case.

The surface coating can be attached to the parts 11a also by laminating the coating layer with a melted surface to the exposed parts 11a which are not formed into a film prior to laminating. Depending on the temperature of the melted surface, the parts 11a may melt or remain solid. In the latter case the parts 11a penetrate into the melted surface and remain upon solidifying of the surface embedded therein merely for mechanical bonding.

All that is said here applies also to the base web of FIG. 1 with exposed parts 11a of the blend fibers 11, which can be used exactly in the same manner in attaching a coating layer to the base web. If the blend fibers 11 of the web according to FIG. 1 are glass fibers, their exposed parts 11a can serve as mechanical bonding means in case the coating layer with a melted surface is laminated on the main layer.

The amount of the thermally bondable fibers in the surface layer 2 can be 10–100 p-% of the entire fibrous amount of the layer 2. 20–40 p-% has proven to be an advantageous range. The fibers of the surface layer 2 are also discontinuous fibers. The weight of the surface layer can alter between 10–100 g/m$^2$, and the length and thickness of the fibers respectively between 2–30 mm and 4–30 um. The rest of the fibers of the surface layer 2 can be other fibers, such as other synthetic polymer fibers which can not be thermally bonded.

Figure 3:
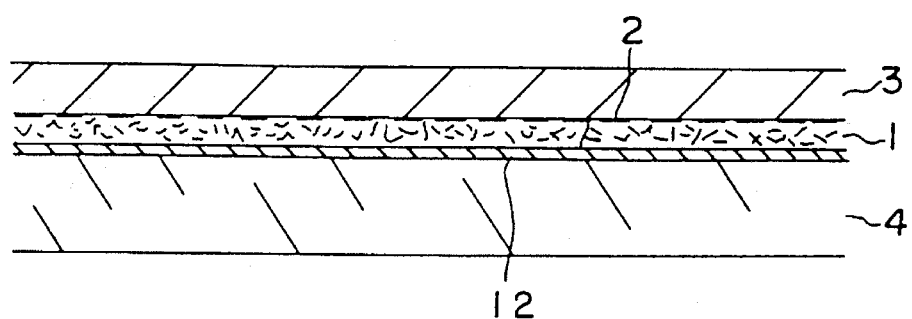
FIG. 3 shows the use of a product manufactured from the web in cross-section.

In FIG. 3 there is shown one use of the base web according to the invention. The product is suitable especially as a covering material on roofs. The product is manufactured by using a base web of the invention as the carrying layer. The covering material comprises a coating layer 3 protecting from weather conditions, beneath of which is the base web of the invention, on which the layer 3 is fixed either by applying a coating layer as a melted paste on top of it or by laminating the coating layer 3 and the base web together in a heated calendering machine. The coating layer 3 can be PVC (polyvinyl chloride) or CPE (chlorinated polyethylene) plastics or other weather-resistant plastics material. Chlorinated plastics materials have proved useful, as they, in addition to good weather resistance and processability, have fire resisting properties due to their chlorine content.

In the following, the position of some fibers inside the base web of FIG. 3 are discussed in more detail, these fiber arrangements serve to improve the strength of the web and are also applicable to the web shown in FIG. 1. The base web contains in consistency with the example of FIG. 1 a main layer 1 formed of discontinuous mineral fibers 10 using a dry method. The web contains also blend fibers 11 discussed hereinabove. The portion of these blend fibers 11 is greater in the proximity of one of the surfaces of the main layer 1 than that is in the middle, in which case the strength of the product is improved. Blend fibers are in this case fibers blended inside the main layer 1 originally during the dry method forming of the mat, whereafter they have been shifted upon needling to the proximity of one of the surfaces. The product, contrary to the disclosure hereinabove, may be prepared also so that this mass centre of the blend fibers 11 lies on the side opposite to that on which the the coating layer 3 is laminated with the help of its melted surface. The coating layer 3 laminated to the relatively smooth surface containing predominantly mineral fibers 10 and some blend fibers on one side, and said mass center of the blend fibers 11 promote the strengthening of the main layer 1 from the opposite sides, and the structure comprises in addition blend fibers 11 extending due to needling and their greater length transversely in the direction of thickness of the main layer 1, thus connecting said two sides with each other.

It shall be understood that in the case of partly melting the surface of a thermoplastic coating layer in laminating process, the penetration of the coating layer material into the base web is not necessarily so pronounced as would be the case if a flowing melted paste were used. In this case the coating layer 3 is practically separated in the depth direction from the main part of the main layer 1 even in absence of a separating layer on its surface. If the transversely extending fibers are of such type that no separating film can not be formed of them, such as chopped glass fibers, the joining of a coating layer 3 by the thermal lamination in the above-mentioned manner to the surface on which the parts 11a of the transversely extending blend fibers 11 are exposed would result in improved strength but not to any inferior quality due to an excessive impregnation of the main layer 1 with the coating material.

The manufacturing stages of the main layer 1 of FIG. 3 comprise the laying of the mineral fibers mixed with the optional blend fibers on a perforated wire to form a mat e.g. in a manner which is described in the previous U.S. Pat. No. 5,014,396. After this stage the layer is compressed to a desired density, generally over 200 kg/m$^3$, whereafter the needling is performed immediately. The stroke length in the needling can be adjusted to comply with the thickness of the layer. If blend fibers are present, the needling can be effected so that the blend fibers move closer to the other surface and even will be exposed on the other surface. The chopped glass fibers, if present as blend fibers, are broken upon needling to a shorter length. The synthetic fibers, if present as blend fibers, remain intact in this process. The two-sided construction obtained in the needling process by means of blend fibers is of use considering the strength of the final product. If either chopped glass fibers or synthetic fibers are used as blend fibers, the strength of the main layer 1 can thus be created by virtue of the fact that there is more blend fibers in the proximity of one of the surfaces than in the middle, in which case the coating layer 3 can be fixed by the above-mentioned laminatig method, that is, the surface of a coating layer constituted of thermoplastic material is heated to the softening temperature and it is joined at this state to the surface of the main layer. The blend fibers act as a reinforcing factor in the way described in the preceding paragraphs.

A good strength for the main layer 1 can thus be ensured without any chemical binders, which in normal dry method using rock wool fibers are used even in an amount of 50% of the weight of the fibers, having a harmful effect on the fire resistance of the product.

In FIG. 3, the above-discussed layer 2 thinner than the main layer 1 and comprising thermally bondable fibers is denoted by a broken line. The layer 2 is between the main layer 1 and the coating layer 3 in the same fashion as in the combination web of FIG. 2. The fibers of this thin layer 2 may be, in conformity with the example of FIG. 2, polyethylene, polypropylene or polyester discontinuous fibers or they may be some blend of the above-mentioned fiber grades, and the layer 2 can be bonded to the main layer 1 by needling.

The base web is fixed at its free surface onto a support 4, which in a roof construction can be any support structure, such as a rock wool or chipboard plate or a plate of cellular polystyrene or polyurethane. The fixing is carried out, depending on the underlying material, with a suitable glue, which in FIG. 3 is denoted by layer 12, or by nailing. The covering material can also be fixed directly on top of an old roofing felt when renovating roof coverings. The base web can also be laid as a separate layer against the support 4, whereafter the coating layer is laid on top of the middle layer. Both layers can be fixed mechanically on the support in this case.

It shall be noted that the blend fibers of the main layer 1 are of use when using a glue layer 12, because the transversely extending blend fibers 11 are attached to the glue on one side and are connected to the coating layer 3 on the opposite side.

The main layer 1 of the base web of the covering material prevents as a thin mat of only ca 1–3 mm in thickness and having no chemical binders surprisingly well the spreading of fire to constructions beneath and also prevents the migration of the substances separated during the fire from the coating layer 3 to other constructions beneath. The experiments have shown also that during a normal use the main layer 1, having no chemical binders, prevents the migration of small-molecule compounds during a long term use either from the coating layer 3 or from the glue layer 12 equally well as do the synthetic polymer fibers generally used for this purpose. One advantage of the base web in accordance with the invention, having no connection to fire protection, is that it can be used as a well-setting "bearing layer" between the coating layer 3 and the support 4, in which case the covering as a whole is well laid on uneven supports.

Figure 4:
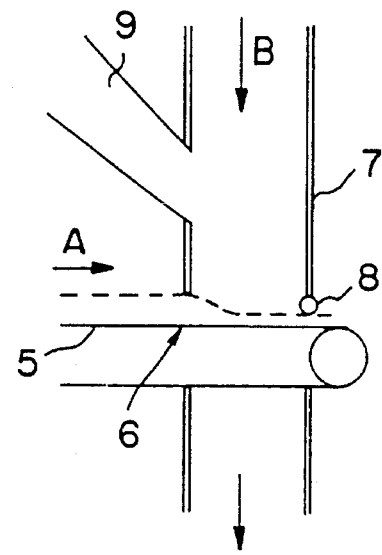
FIG. 4 illustrates a method for manufacturing the web of the invention.

FIG. 4 shows a manufacturing line for producing the base web of the invention. The discontinuous mineral fibers 10 forming the main layer 1 are fed, optionally blended with other fibers, in the direction of arrow A, by means of a perforated conveyor belt 5. The fibers have been previously brought on the belt by means of a very fast rotating spike roll, known as such, using an air stream, in a state where they are well separated from each other. At this stage the mat on the belt 5 is somewhat wave-like.

The transport conveyor 5 carries the fibrous mat forward to a point 6 where the fibrous mat comes underneath a vertical air channel 7 disposed above the conveyor. In the air channel air is blown downwards in the direction of arrow B in such a fashion that the air goes through the fibrous mat, denoted by a broken line in the figure, and through the conveyor 5 and passes further along a channel disposed underneath the conveyor. At the same time the fibrous mat is compressed against the conveyor 5, which effect is illustrated by a broken line. In the inlet direction of the conveyor there is a gap between the front wall of the air channel and the conveyor 5, through which the thick fibrous mat passes to cross the air channel. In the rear wall of the channel at the point where the compressed fibrous mat leaves the channel 5, there is a roll 8 which on rotating in contact with the upper surface of the fibrous mat seals at the same time the gap present at this location. The fibers forming the surface layer 2 in accordance with the invention are supplied into the air channel 7 above the point where the fibrous mat enters the channel 7. The supply takes place along an obliquely downwards directed channel 9 which joins the channel 7. The fibers are fed into the channel by means of a fast rotating spike roll which disentangles and slings the fibers into the channel 9 from which they are caught with the air stream of the air channel 7, which presses the fibers on top of the rest of the fibrous mat. In this way a thin fibrous layer 2 having an even surface can be created on top of the main layer 1 as early as at this stage due to the fact that the points containing less fibers in the main layer 1 permit the air better to pass through, whereby these points automatically collect more fibers of the surface layer with the air stream B.

After the conveyor 5 the combination web so obtained is passed to needling, at which stage part of the fibers of the surface layer are orientated towards the main layer 1 by punching mechanically by needles. These fibers connect and bind mechanically the fibers of the surface layer 2 to those of the main layer 1. Depending on the thickness of the fibrous mat and the length of the discontinuous fibers of the surface layer 2 the parts of the fibers can in this case become exposed also on the opposite side, and the back side is thereby provided with a pile-like structure by virtue of these protruding fibers penetrated through the main layer from the surface layer. The spike rolls and the needling are known previously in other fiber technology and they are therefore not described in greater detail. After the needling the fibers of the surface layer can be bonded together using thermal treatment, e.g. using temperatures within a range of 100° C.–200° C., depending on the materials of the surface layer. Heat treatment devices known previously can be used in the method.

The surface layer 2 can also be manufactured so that a thicker mineral fiber mat forming the main layer 1 is formed on top of the thin surface layer formed previously on the wire, in which case the method is in principle the same as above. Also in this case the layers can be bonded to each other by subsequent needling.

It is of course possible to influence on the grammage and the density of the fibrous mat by the supply rate of the fibers and by the velocity of the air stream B. As a common rule, by using fast rotating spike rolls disentangling effectively the fibers from each other, the mat obtained is provided with a more bulky texture, in which the fibers are more randomly oriented.

After the heat treatment the mat obtained can be wound e.g. into a roll and it can be used later as the raw material in the above-mentioned constructional elements.

The above described operational stages can be used also in cases where the surface layer 2 is not formed to the main layer 1, that is, where the blend fibers 11 are mixed with the discontinuous mineral fibers 10 before the forming of the mat.

EXAMPLES

Combination Web

A web according to FIG. 2 and forming the main layer 1 was manufactured from rock wool fibers having the length below 5 mm and the thickness of 6 um. The web had the final thickness of ca. 3 mm. The fibers were collected to form a web in such a fashion that they became randomly oriented. The weight of this layer was ca. 600 g/m$^2$.

On the upper surface of this main layer was sucked by means of an air stream a surface layer having the thickness of ca. 0.5 mm consisting of polyester fibers and polyethylene fibers of a length of ca. 20 mm and of a thickness of ca. 20 um. The weight of the surface layer was estimated to be ca. 100 g/m$^2$. The surface layer was fastened to the main layer by needling. After the fastening the surface layer was heat treated at a temperature of ca. 100° C. for obtaining the final combination web, at which stage the polyethylene fibers melted and glued the polyester fibers to each other.

After the heat treatment the binding layer could be seen on the surface of the main layer as a ca. 1 mm thick light-coloured layer against the brownish colouring of the main layer, that is, of the rock wool fibers. The binding layer could not be separated from the main layer by traction, but the entire combination web was disintegrated.

A PVC-paste layer was applied onto the combination web to form a coating layer having the final thickness of ca. 1 mm. The melted paste layer caused simultaneously the melting of the polyester fibers, whereby the coating layer became firmly fixed on the surface layer. The combination web could not be separated on traction from this surface either, but the entire combination web was disintegrated.

The building element according to the invention has proved to have a good dimensional stability and step sound dampening capability.

Experiments with the web according to FIG. 1

Some fire resistance experiments conducted with covering materials having the base web according to FIG. 1 will be described in the following:

Experiment 1

Covering constructions having the size of 400 mm×1000 mm were prepared from the samples (constructions A, B and C). The constructions of the test pieces were as follows, starting from the upper face:

Construction A

"Alkorplan" single ply cover 1,2 mm (PVC coating layer)
Mineral fiber web, consisting of rock wool fibers and comprising 15% polyester fibers, bonded by needling
Surface membrane PX 120/3800 (bituminous roofing felt of ca. 2–3 mm in thickness)
The surface membrane PX had been glued to a chipboard support, and the mineral fiber web and the "Alkorplan" covering had been fixed by nailing to said support.

Construction B

Surface membrane PX 120/3800
Mineral fiber web (Construction A)
Aluminium-coated polyurethane plate having a thickness of 55 mm
The different layers had been fixed by nailing to the polyurethane plate.

Construction C

Surface membrane PX 120/3800
Mineral fiber web, 2 layers (Constr. A)
Polystyrene plate having a thickness of 100 mm, grade N.
The surface membrane PX and the mineral fiber webs had been fixed by nailing to the polystyrene plate. The measured thickness of the mineral fiber web used in the experiments was ca. 2–3 mm and the mass was 480 g/m².

Experiments:

The fire resistance was determined according to the standard SFS 4194:E, Determination of the fire resistance of coverings against an exterior fire (Nordtest-method NT FIRE 006, VTT-1251-80). The results of the experiments are shown in Annexes 1 and 2.

Summary:

On the experiment results it can be concluded that the covering materials A, B and C tested met the requirements set for a covering material of moderate fire spreading. These requirements are presented in the publication by the Nordic Committee on Building Regulations (NKB Product Rules 7, January 1989).

Experiment 2

The following samples were tested in the experiment.

Number 1

Covering layer Alkorplan 35076 (1,2 mm thick PVC)

Intermediate layer mineral fiber web (rock wool) containing ca. 10–12% polyester, thickness ca. 2 mm and grammage ca. 340 g/m², bonded by needling One polystyrene plate, thickness 50 mm and density 19 kg/m².

Number 2

Covering layer and intermediate layer as hereinabove

Polyurethane plate as a support, thickness 50 mm, density 41 kg/m³.

Number 3

Covering layer as hereinabove

Mineral fiber web as an intermediate layer (rock wool) containing ca. 15% polyester fibers and having a thickness of ca. 1,5 mm and a grammage of ca. 280 g/m², bonded by needling Polystyrene plate as a support, thickness 50 mm, density 19 kg/m³.

A calcium silicate plate served as a support for all three samples.

A test according to the standard DS/INSTA 413, corresponding to the Nordtest-method NT FIRE 006 was used as the test method. The results of the experiments are shown in Annex 3.

ANNEX 1

| Experiment | Wind speed | | | | | | | |
|---|---|---|---|---|---|---|---|---|
| | 2 m/s | | | | 4 m/s | | | |
| no. | 1 | 2 | 3 | $\bar{X}$ | 4 | 5 | 6 | $\bar{X}$ |
| Construction A | | | | | | | | |
| Covering was ignited, s | 35 | 35 | 35 | 35 | 40 | 40 | 35 | 38 |
| Flames went out, min:s | 4:55 | 5:40 | 5:20 | 5:18 | 3:35 | 3:25 | 3:30 | 3:30 |
| Glowing ended, min:s | 11:25 | 12:55 | 10:35 | 11:38 | 9:35 | 9:20 | 9:00 | 9:18 |
| Length of damage in covering, cm*) | 54 | 50 | 55 | 53 | 50 | 52 | 56 | 53 |
| Length of charred area in support, cm*) | 24 | 25 | 29 | 26 | 27 | 25 | 30 | 27 |
| Construction B | | | | | | | | |
| Covering was ignited, s | 30 | 35 | 35 | 33 | 40 | 40 | 40 | 40 |
| Flames went out, min:s | 7:30 | 6:15 | 6:35 | 6:47 | 5:05 | 4:50 | 5:45 | 5:13 |
| Glowing ended, min:s | 9:00 | 9:20 | 8:30 | 8:57 | 7:20 | 6:55 | 7:30 | 7:15 |
| Length of damage in covering, cm | 51 | 44 | 46 | 47 | 45 | 44 | 46 | 45 |
| Length of charred area in support, cm*) | 36 | 39 | 39 | 38 | 41 | 39 | 41 | 40 |

*)as measured from the centre of the gridiron

ANNEX 2
Construction C

| Experiment | Wind speed | | | | | | | |
|---|---|---|---|---|---|---|---|---|
| | 2 m/s | | | | 4 m/s | | | |
| no. | 1 | 2 | 3 | $\bar{X}$ | 4 | 5 | 6 | $\bar{X}$ |
| Covering was ignited, s | 35 | 35 | 35 | 35 | 35 | 40 | 40 | 38 |
| Flames went out, min;s | 5:10 | 5:05 | 5:20 | 5:12 | 3:55 | 3:30 | 4:35 | 4:00 |
| Glowing ended, min:s | 8:20 | 7:25 | 9:30 | 8:25 | 7:15 | 7:25 | 7:15 | 7:18 |
| Length of damage in covering, cm*) | 42 | 45 | 47 | 45 | 45 | 41 | 42 | 43 |
| Length of charred area in support, cm*) | 35 | 39 | 39 | 38 | 37 | 34 | 32 | 34 |

*)as measured from the centre of the gridiron

ANNEX 3

| Sample no. | 1 | 2 | 3 |
|---|---|---|---|
| Ignition of construction, s | 14 | 13 | 14 |
| Going out of flames, min:s | 3:40 | 4:55 | 7:05 |
| End of glowing, min:s | 9:00* | 7:00* | 8:00* |
| Length of damged area, (as measured from the centre of fire), mm | | | |
| in PVC-layer | 450 | 435 | 500 |

-continued

ANNEX 3

| Sample no. | 1 | 2 | 3 |
|---|---|---|---|
| in mineral web | 210 | 255 | 475 |
| in the support | 445 | 365 | 480 |

*extinguished

We claim:

1. A non-woven fabric formed from a major amount of discontinuous mineral, ceramic or carbon fibers blended with a minor amount of discontinuous synthetic thermoplastic fibers having a greater average length than said mineral, ceramic or carbon fibers, said mat having been formed through use of the following processing sequence:
   (1) air stream fiber deposition to form a mat without application of chemical binders,
   (2) needling through one or both major surfaces of the mat at a density of about 2–20 punches per square centimeter, calculated as the total punches made on the mat through one or both major surfaces thereof, to effect selective engagement and transport of synthetic thermoplastic fibers to the proximity of the major surface of the mat opposed to that penetrated by the needles, and
   (3) heat treating the needled mat sufficiently to cause at least plasticization of thermoplastic fibers proximate at least one major surface of the mat.

2. The mat of claim 1 having been needled through both major surfaces.

3. The mat of claim 1 wherein the discontinuous mineral fibers are rock wool fibers.

4. The mat of claim 1 wherein the discontinuous synthetic thermoplastic fibers are bicomponent.

5. The mat of claim 1 wherein a surface membrane has been formed as a consequence of the heat treating.

6. The mat of any one of claims 1–5 having had applied thereto, subsequent to the referenced processing sequence, a non-fibrous synthetic thermoplastic material layer.

7. A non-woven fabric mat formed from a major amount of discontinuous mineral, ceramic or carbon fibers blended with a minor amount of chopped glass fibers having a greater average length than said mineral, ceramic or carbon fibers, said mat having been formed through the use of the following processing sequence:
   (1) air stream fiber deposition to form a mat without application of chemical binders and
   (2) needling through one or both major surfaces of the mat at a density of about 2–20 punches per square meter, calculated as the total punches made on the mat through one or both major surfaces thereof, to effect selective engagement and transport of chopped glass fibers to the proximity of the major surface of the mat opposed to that penetrated by the needles.

8. The mat of claim 7 having been needled through both major surfaces.

9. The mat of claim 7 wherein the discontinuous mineral fibers are rock wool fibers.

10. The mat of any one of claims 7–9 having had applied thereto, subsequent to the referenced processing sequence, a non-fibrous synthetic thermoplastic material layer.

* * * * *

UNITED STATES PATENT AND TRADEMARK OFFICE
CERTIFICATE OF CORRECTION

PATENT NO. : 5,458,960
DATED : Oct. 17, 1995
INVENTOR(S) : Nieminen et al

It is certified that error appears in the above-identified patent and that said Letters Patent is hereby corrected as shown below:

Please insert on the Title page;

Item [63] Related U.S. Application Data, Continuation-in-Part of Ser. No. 656,143, Feb. 5, 1991, abandoned.---

Item [30] Foreign Application Priority Data,

Jun. 5, 1989 [FI] Finland........892751---.

Col. 1, following the title, insert ---This is a continuation-in-part of U.S. Application Ser. No. 656,143 filed Feb. 5, 1991, now abandoned and which is the U.S. national phase of International Application No. PCT/FI90/00153.---

Signed and Sealed this

Twenty-fifth Day of January, 2000

Attest:

*Attesting Officer*

*Acting Commissioner of Patents and Trademarks*